(12) United States Patent
Kawashima

(10) Patent No.: US 9,762,130 B2
(45) Date of Patent: Sep. 12, 2017

(54) SWITCHING CONTROLLER FOR SWITCHING POWER SUPPLY

(71) Applicant: Fuji Electric Co., Ltd., Kanagawa (JP)

(72) Inventor: Tetsuya Kawashima, Nagano (JP)

(73) Assignee: FUJI ELECTRIC CO., LTD., Kanagawa (JP)

( * ) Notice: Subject to any disclaimer, the term of this patent is extended or adjusted under 35 U.S.C. 154(b) by 10 days.

(21) Appl. No.: 15/150,658

(22) Filed: May 10, 2016

(65) Prior Publication Data
US 2016/0359418 A1 Dec. 8, 2016

(30) Foreign Application Priority Data

Jun. 2, 2015 (JP) ................. 2015-112396

(51) Int. Cl.
*H02M 3/335* (2006.01)
*H02M 1/44* (2007.01)
*H02M 1/00* (2006.01)

(52) U.S. Cl.
CPC ......... *H02M 3/33523* (2013.01); *H02M 1/44* (2013.01); *H02M 3/33515* (2013.01);
(Continued)

(58) Field of Classification Search
CPC ......... H02M 3/33538; H02M 3/33546; H02M 3/33515; H02M 3/33576; H02M 3/33592; H02M 3/33507; H02M 3/335
(Continued)

(56) References Cited

U.S. PATENT DOCUMENTS

2008/0309303 A1 12/2008 Morota et al.
2010/0315841 A1* 12/2010 Saji ................. H02M 3/33507
363/21.12

(Continued)

FOREIGN PATENT DOCUMENTS

JP 2004-266780 A 9/2004
JP 2008-312359 A 12/2008
(Continued)

*Primary Examiner* — Timothy J Dole
*Assistant Examiner* — Bryan R Perez
(74) *Attorney, Agent, or Firm* — Chen Yoshimura LLP

(57) ABSTRACT

A switching controller includes an output voltage detector that detects the output voltage of a switching power supply, a compensator, a frequency setter, a frequency sweeper, and a voltage control oscillator that are all connected in series. The switching controller also includes an ON-time generator that generates an ON time for a switching element and a pulse-width modulation signal generator that generates a pulse-width modulation signal using the output from the voltage control oscillator and the output from the ON-time generator. The frequency shifter includes a shift amount calculator that calculates a shift amount on the basis of a first coefficient that is generated by a first coefficient generator and changes as time elapses, a second coefficient generated by a second coefficient generator in accordance with the output value from the frequency setter, a third coefficient that is generated by a third coefficient generator and exhibits a different relationship with the output value from the frequency setter than the second coefficient, and the output value from the frequency setter.

11 Claims, 13 Drawing Sheets

(52) U.S. Cl.
CPC .............. *H02M 2001/0003* (2013.01); *H02M 2001/0032* (2013.01); *Y02B 70/16* (2013.01)

(58) Field of Classification Search
USPC .. 363/18, 21.12, 21.13, 21.15, 21.16, 21.17, 363/21.18, 20, 21.04, 21.05, 21.07, 21.08, 363/21.09, 21
See application file for complete search history.

(56) References Cited

U.S. PATENT DOCUMENTS

| | | | |
|---|---|---|---|
| 2010/0321956 A1* | 12/2010 | Yeh ................... | H02M 3/33507 363/16 |
| 2013/0033902 A1* | 2/2013 | Zhang ............... | H02M 3/33523 363/15 |
| 2014/0078784 A1 | 3/2014 | Nishijima | |

FOREIGN PATENT DOCUMENTS

| | | |
|---|---|---|
| JP | 2014-064379 A | 4/2014 |
| JP | 5550701 B2 | 7/2014 |

\* cited by examiner

| Frequency Sweeper Input Dfsw[8:0] | Second Coefficient Generator Output |
|---|---|
| Dfsw<100 | 0 |
| 100≦Dfsw<200 | 1 |
| 200≦Dfsw<300 | 2 |
| 300≦Dfsw<400 | 3 |
| 400≦Dfsw<500 | 4 |
| 500≦Dfsw≦511 | 5 |

FIG. 5

| Frequency Sweeper Input Dfsw[8:0] | Second Coefficient Generator Output |
|---|---|
| Dfsw<128 | 1 |
| 128≦Dfsw<192 | 2 |
| 192≦Dfsw<256 | 2 |
| 256≦Dfsw<320 | 3 |
| 320≦Dfsw<384 | 4 |
| 384≦Dfsw≦448 | 4 |
| 448≦Dfsw≦511 | 5 |

SWITCHING CONTROLLER FOR SWITCHING POWER SUPPLY

BACKGROUND OF THE INVENTION

Technical Field

The present invention relates to a switching controller that implements frequency spreading control for a switching power supply.

Background Art

Typically, switching power supplies turn a switching element ON/OFF using pulse signals to generate a desired output voltage Vout from an input voltage Vin. These switching power supplies also typically include a switching controller that keeps the output voltage constant even if the input voltage or the load current fluctuates. Such switching controllers typically utilize a pulse-width modulation (PWM) control scheme in which the output voltage error (that is, an amplified signal of the difference between the output voltage and a target voltage) is detected and the ratio of time the pulse signal is ON to OFF (that is, the duty cycle) is adjusted accordingly.

In recent years, regulations on electromagnetic interference (EMI) generated by electronic devices have been established. In switching power supplies, harmonic components in the frequencies of the pulse signals that control the switching element (hereinafter, "switching frequency fsw") can pose a problem. One known solution to this problem is to include a frequency sweeper in the switching controller of the switching power supply and modulate the switching frequency fsw to a desired shift amount Δfsw in order to reduce the average value in the noise spectrum (see Patent Documents 1 and 2, for example).

Meanwhile, in order to improve power conversion efficiency as well as reduce switching loss (which becomes the dominant form of loss during light loading), switching power supplies also sometimes utilize a frequency control scheme in which the switching frequency is decreased as the load current decreases (that is, a pulse frequency modulation (PFM) control scheme) in addition to the PWM control scheme.

Related Art Documents

Patent Documents

Patent Document 1: Japanese Patent Application Laid-Open Publication No. 2004-266780
Patent Document 2: Japanese Patent Application Laid-Open Publication No. 2008-312359

SUMMARY OF THE INVENTION

However, in switching power supply switching controllers that have a PFM control feature, if the frequency shift amount is constant, the frequency spreading ratio (that is, the ratio of the frequency shift amount to the switching frequency) decreases as the switching frequency increases. This tends to lessen the desired reduction in the noise spectrum. Therefore, when using a PFM control scheme, the frequency shift amount must also be changed according to the switching frequency.

In the conventional example disclosed in Patent Document 1 and illustrated in FIG. 12, a triangle wave oscillator generates a switching frequency, and a D/A converter sets a current that determines the oscillating frequency. In this configuration, the frequency shift amount can be changed by changing the input to the D/A converter. However, the current Iref1 that determines the switching frequency is fixed, and therefore it is not possible to implement a PFM control scheme in which the switching frequency is changed according to the load on the switching power supply. Even if the current Iref1 could be changed according to the load, the current Iss that determines the current Iref1 and the shift amount is still fixed. This means that the frequency shift amount remains constant even if the switching frequency is changed and that the desired noise reduction effect becomes increasingly less pronounced as the switching frequency increases.

Meanwhile, the conventional technology disclosed in Patent Document 2 and illustrated in FIG. 13 includes a PFM control circuit 120 and a PFM frequency modulation circuit 130, thereby making it possible to implement a PFM control scheme in which the switching frequency is controlled according to the load and also making it possible to change the frequency shift amount according to the switching frequency. In this conventional technology, an error amplifier detects the output error to determine the required control amount, and the output Vfb of the error amplifier is input to the PFM control circuit 120 in order to determine the appropriate input current for a current mirror circuit 140. The PFM frequency modulation circuit 130 generates a triangle wave signal with a period sufficiently longer than the switching frequency and an amplitude that changes according to the output current from the current mirror circuit 140. This triangle wave signal is converted to a current that is then superposed on another output current of the current mirror circuit 140 of the PFM control circuit 120 in order to modulate (shift) the frequency of the output signal from the PFM control circuit. The PFM control circuit 120 generates a rectangular wave in which the frequency changes according to the superposed currents. This changing frequency is used as the switching frequency. Therefore, superposing the output current of the current mirror 140 that changes according to the output Vfb of the error amplifier on the output current of the PFM frequency modulation circuit 130 that changes according to the other output current of the current mirror 140 that also changes according to the output Vfb of the error amplifier makes it possible to change the switching frequency according to the load as well as modulate the frequency shift amount.

However, in the conventional technology disclosed in Patent Document 2, the frequency shift amount is determined by the maximum amplitude (height) of the triangle wave signal Vjit output from the PFM frequency modulation circuit. The maximum amplitude of the triangle wave signal Vjit is determined by the current input to the terminal Vh of the triangle wave oscillator illustrated in FIG. 13, and therefore the amplitude of that triangle wave changes proportional to the output Vfb of the error amplifier (that is, proportional to the load current when the input voltage and the output voltage are held constant). This means that it is not possible to change the frequency shift amount just for certain switching frequencies.

Consider a switching power supply in which the switching frequency is changed according to the load current within a frequency range of 1 to 100 kHz, for example, and any conductive noise at 150 kHz or above would be in violation of regulations. In this case, such conductive noise would be constituted by second-order harmonics and above while running the switching power supply at a switching frequency of greater than or equal to 75 kHz, and such conductive noise would be constituted by third-order harmonics and above when running the switching power supply at a switching frequency of less than 75 kHz. Measuring the noise at 150 kHz or above for the switching frequency band in the latter case would reveal lower noise peaks. In this case, methods for reducing the noise at switching frequencies of greater than or equal to 75 kHz might potentially include a first method in which a noise suppression filter is added when running the device at switching frequencies of 75 kHz or above and a second method in which the frequency shift amount is increased only for switching frequencies of 75 kHz or above, for example.

In the conventional technology disclosed in Patent Document 2, the frequency shift amount cannot be changed just for certain switching frequency bands. Therefore, when using the second method, the frequency shift amount must be increased uniformly for all switching frequencies. However, doing this tends to result in problems such as increasing the magnitude of output voltage ripples caused by frequency spreading, which can negatively impact the stability of the output voltage.

The present invention was made in view of the above-mentioned problems in the conventional technologies disclosed in Patent Documents 1 and 2 and aims to provide a switching controller for a switching power supply that makes it possible to freely set the frequency shift amount for a prescribed switching frequency or switching frequency range. Accordingly, the present invention is directed to a scheme that substantially obviates one or more of the problems due to limitations and disadvantages of the related art.

Additional or separate features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, in one aspect, the present disclosure provides a switching controller for a switching power supply, including: an output voltage detector that detects a deviation of an output voltage of the switching power supply from a target voltage; a compensator that calculates a control amount in accordance with the deviation detected by the output voltage detector; a frequency setter that sets a primary frequency in accordance with the control amount calculated by the compensator; a frequency sweeper that generates a frequency shift amount that changes in time and adds the generated frequency shift amount to the primary frequency set by the frequency setter so as to set a time-varying frequency; a voltage control oscillator that outputs an oscillating signal having the time-varying frequency set by the frequency sweeper; an ON-time generator configured to receive a signal indicating a current flowing through a switching element of the switching power supply and the control amount calculated by the compensator, the ON-time generator generating an ON time signal in accordance with the received signal indicating the current and the control amount; and a pulse-width modulation signal generator that receives the oscillating signal having the time-varying frequency from the voltage control oscillator and the ON time signal from the ON-time generator and generates a pulse-width modulation signal in accordance therewith for use in switching the switching element of the switching power supply; wherein the frequency sweeper includes: a first coefficient generator that generates a periodically time-varying first coefficient that sets forth a frequency sweeping period and a primary shape of a frequency sweeping curve; a second coefficient generator that generates a second coefficient having a value with respect to each possible frequency or each possible range of frequencies that the frequency setter may set as the primary frequency; a third coefficient generator that generates a third coefficient having a value with respect to each possible frequency or each possible range of frequencies that the frequency setter may set as the primary frequency, the third coefficient generator being independently settable from the second coefficient generator; and a shift amount calculator that calculates the frequency shift amount to be added to the primary frequency on the basis of the first coefficient, the second coefficient, and the third coefficient.

One aspect of the present invention makes it possible to freely set the frequency shift amount for a prescribed switching frequency or switching frequency range, thereby making it possible to reduce conductive noise due to harmonic components in the switching frequency used in a switching power supply.

It is to be understood that both the foregoing general description and the following detailed description are exemplary and explanatory, and are intended to provide further explanation of the invention as claimed.

BRIEF DESCRIPTION OF THE DRAWINGS

FIG. 2A is a graph showing the input/output properties of the frequency setter, and FIG. 2B is a graph showing the relationship between the frequency fsw of an output signal Vfsw from the voltage control oscillator and an output current when frequency spreading is not implemented.

FIG. 5 is a table showing the input/output properties of the second coefficient generator illustrated in FIG. 3.

FIG. 8A is a graph showing the input/output properties of the frequency setter, and FIG. 8B is a graph showing the relationship between the switching frequency of the voltage control oscillator and the input of the frequency setter.

FIG. 9A is a graph showing the relationship between the number of switching cycles counted in the first coefficient generator and the first coefficient, and FIG. 9B is a table showing the correspondence between the input to the frequency sweeper and the second coefficient generated by the second coefficient generator.

DETAILED DESCRIPTION OF EMBODIMENTS

Figure 1:
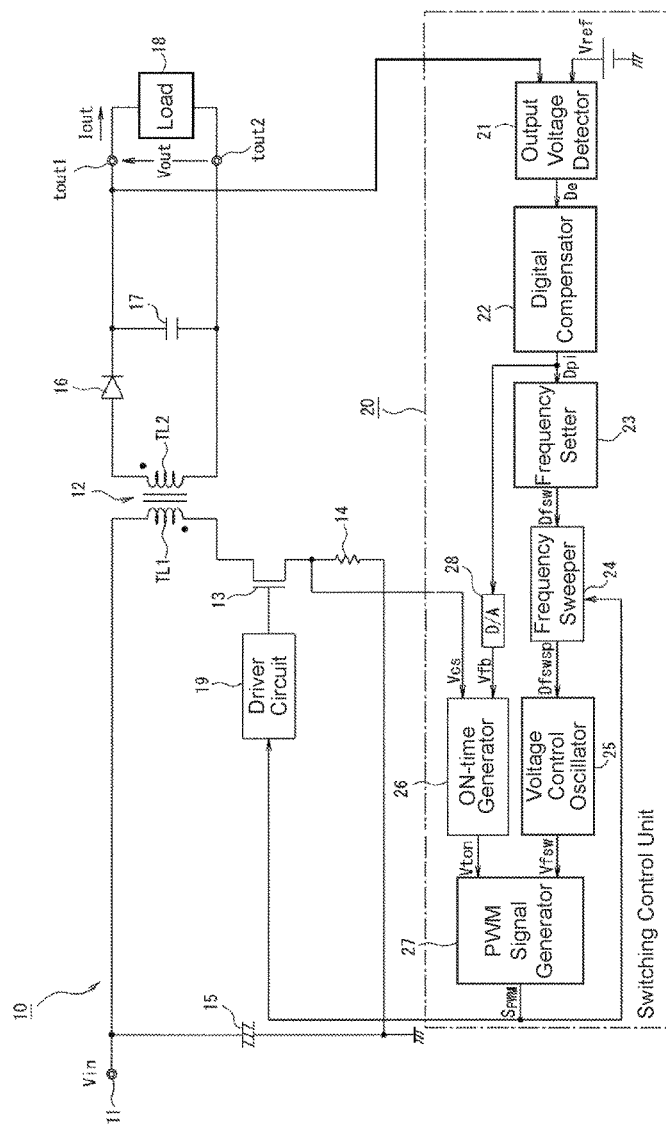
FIG. 1 is a block diagram illustrating a switching controller for a switching power supply according to Embodiment 1 of the present invention.

Next, an embodiment of the present invention will be described with reference to figures. In the figures described below, the same reference characters or similar reference characters are used for components that are the same or similar.

Moreover, the embodiments described below are merely examples of devices or methods for implementing the technical concept of the present invention. The technical concept of the present invention is not limited to the component part materials, shapes, structures, arrangements, or the like presented in the following description. Various modifications may be made to the technical concept of the present invention within the technical scope defined by the claims.

Next, a switching controller for a switching power supply according to one embodiment of the present invention will be described with reference to figures.

As illustrated in FIG. 1, a switching power supply 10 is a flyback converter switching power supply. The switching power supply 10 includes an input terminal 11 to which a DC power source rectified from an AC power source is input. One end of a primary coil TL1 of a transformer 12 is connected to the input terminal 11. The other end of the primary coil TL1 of the transformer 12 is grounded via a switching element 13 and a current detection resistor 14. A smoothing input capacitor 15 is connected between the input terminal 11 and the ground.

One end of a secondary coil TL2 of the transformer 12 that has a reversed polarity relative to the primary coil TL1 is connected via a diode 16 to one output terminal tout1. The other end of the secondary coil TL2 is connected to another output terminal tout2. Moreover, a smoothing output capacitor 17 is connected between a connection point between the cathode of the diode 16 and the output terminal tout1 and a connection point between the other end of the secondary coil TL2 and the output terminal tout2.

A load 18 is connected between the output terminals tout1 and tout2.

The switching element 13 is a semiconductor switching element such as a MOSFET or an IGBT, and the gate of the switching element 13 is connected to a driver circuit 19. This driver circuit 19 turns the switching element 13 ON and OFF.

As the switching element 13 switches ON and OFF, an alternating voltage is induced in the secondary coil TL2 of the transformer 12. This induced voltage is rectified by the diode 16, smoothed by the output capacitor 17, and then output to the load 18 as the output voltage Vout.

The driver circuit 19 turns the switching element 13 ON and OFF according to a pulse-width modulation (PWM) signal $S_{PWM}$ supplied by a switching control circuit 20.

The switching control circuit 20 includes an output voltage detector 21, a digital compensator 22, a frequency setter 23, a frequency sweeper 24, a voltage control oscillator 25, an ON-time generator 26, a pulse-width modulation signal generator (hereinafter, "PWM signal generator") 27, and a D/A converter 28.

The output voltage detector 21 includes a comparator or an op-amp, an insulated signal transmission element such as a photocoupler or a transformer, and an A/D converter, for example. A reference voltage (target voltage) Vref is input to the output voltage detector 21, and the difference between the reference voltage Vref and a detected value of the output voltage Vout (the output voltage Vout itself, a divided voltage, a level-shifted voltage, or the like) is converted to a digital value to produce a digital error detection signal De. This digital error detection signal De is then output to the digital compensator 22.

The digital compensator 22 implements a proportional integral (PI) control algorithm such as that given below by formula (1) to calculate a control amount Dpi on the basis of the digital error detection signal De input from the output voltage detector 21. The calculated control amount Dpi is then output to the frequency setter 23 and the ON-time generator 26. Although a detailed description of the control algorithm will be omitted here, this control amount Dpi changes according to the load current such that the output voltage remains constant.

$$Dpi(n)=Dpi(n-1)+C0*De(n)-C1*De(n-1) \quad (1)$$

Dpi(n): The output of the digital compensator for the current switching cycle n.

Dpi(n−1): The output of the digital compensator for the previous switching cycle (n−1).

De(n): The digital error signal for the current switching cycle n.

De(n−1): The digital error signal for the previous switching cycle (n−1).

C0: A first calculation coefficient.

C1: A second calculation coefficient.

Figure 2A:
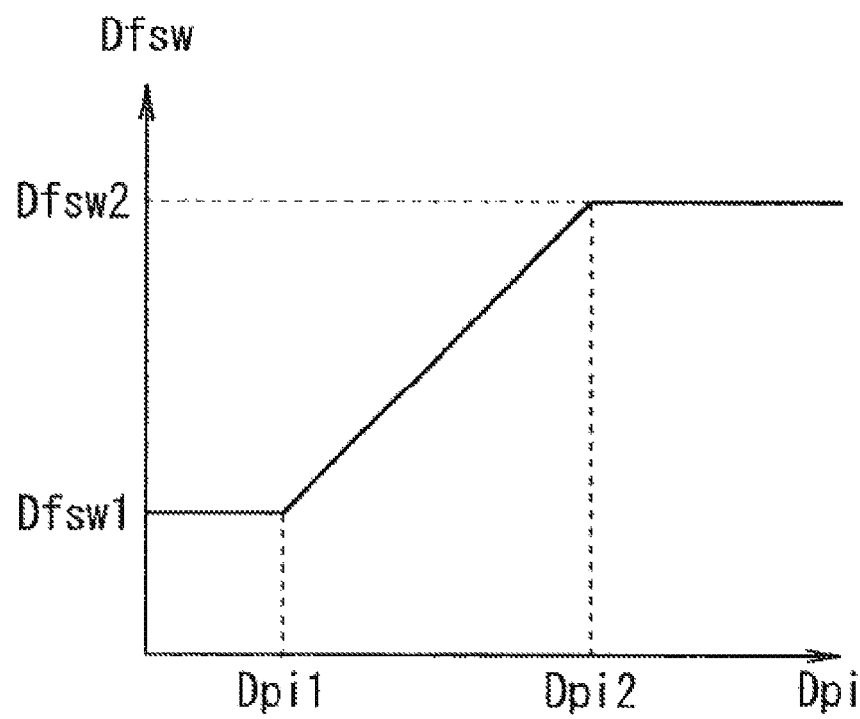
FIGS. 2A and 2B contain graphs showing the input/output properties of the frequency setter and the voltage control oscillator illustrated in FIG. 1.

The control amount Dpi output from the digital compensator 22 is input to the frequency setter 23, which converts the control amount Dpi to a code and exhibits the input/output properties illustrated in FIG. 2A, for example. In other words, while the control amount Dpi remains between 0 and a first prescribed value Dpi1, the frequency setting value Dfsw remains at a relatively small first setting value Dfsw1. Furthermore, once the control amount Dpi exceeds the first prescribed value Dpi1 but remains less than or equal to a second prescribed value Dpi2 that is larger than the first prescribed value Dpi1, the frequency setting value Dfsw increases proportionally with increases in the control amount Dpi up to a second setting value Dfsw2 that is greater than the first setting value Dfsw1. Finally, once the control amount Dpi exceeds the second prescribed value Dpi2, the frequency setting value Dfsw remains constant at the second setting value Dfsw2.

Figure 2B:
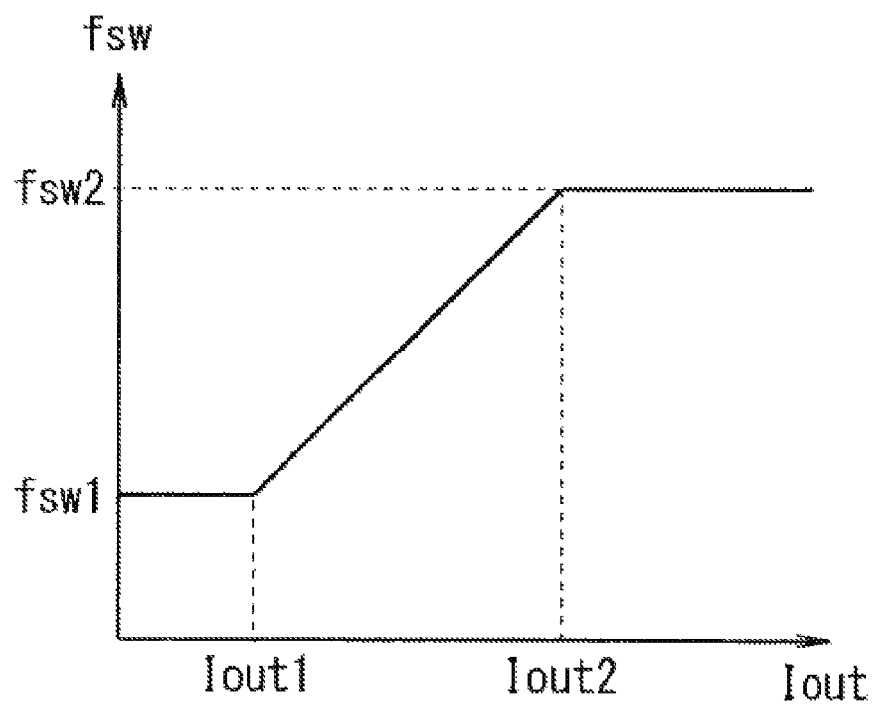

Here, it is assumed that the frequency sweeper 24 does not perform frequency spreading control (which will be described in more detail later) and that the input and output of the frequency sweeper 24 are therefore equal. Furthermore, it is assumed that the frequency fsw of the output signal Vfsw of the voltage control oscillator 25 that is downstream of the frequency sweeper 24 is proportional to the frequency of the voltage input to the voltage control oscillator 25, and it is also assumed that the control amount Dpi output from the digital compensator 22 changes according to the load current Tout (in other words, it is assumed that the output voltage Vout remains fixed). FIG. 2B illustrates the resulting relationship between the frequency fsw and the output current Iout of the switching power supply 10 under these assumptions.

The current flowing through the switching element 13 is converted to a current detection voltage Vcs by the current detection resistor 14 and then input to the ON-time generator 26. Furthermore, the control amount Dpi output from the digital compensator 22 is converted to an analog feedback voltage Vfb by the D/A converter 28 and then input to the ON-time generator 26 as well. The ON-time generator 26 includes a comparator that compares the current detection voltage Vcs to the feedback voltage Vfb. When the comparator detects that the current detection voltage Vcs exceeds the feedback voltage Vfb (that is, Vcs>Vfb), an ON-time generation signal Vton switches from a low level L to a high level H. This ON-time generation signal Vton is output to the PWM signal generator 27.

The PWM signal generator 27 outputs a pulse-width modulation signal (hereinafter, a "PWM signal") $S_{PWM}$ to the driver circuit 19. This PWM signal $S_{PWM}$ is a rectangular wave that has the same period as the output signal Vfsw from the voltage control oscillator 25 and is maintained at a high level H from the time the output signal Vfsw of the voltage control oscillator 25 rises until the time the ON-time generation signal Vton from the ON-time generator 26 switches to the respective high level H state.

Therefore, the driver circuit 19 turns the switching element 13 ON and OFF according to the PWM signal $S_{PWM}$.

Figure 3:
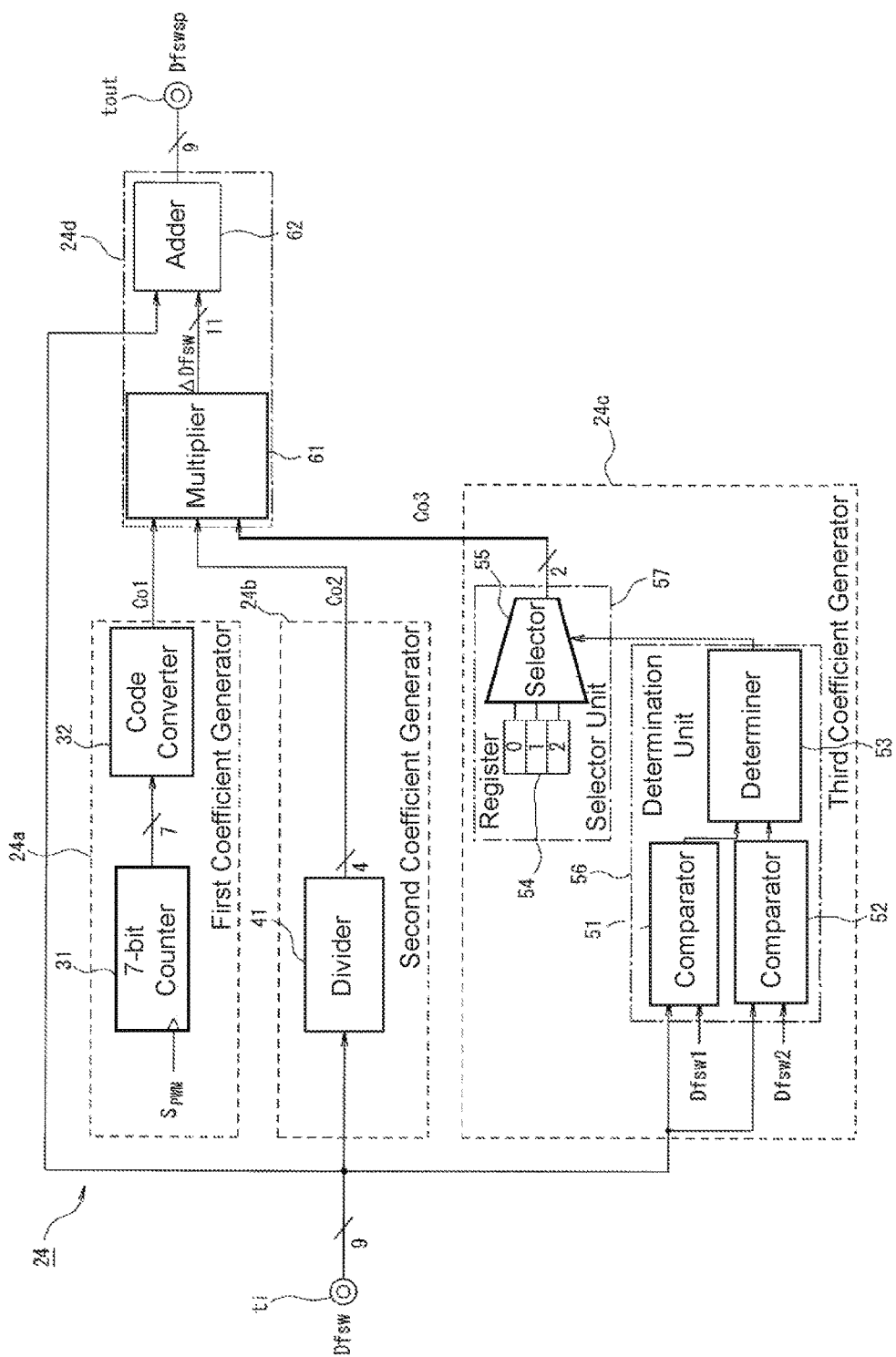
FIG. 3 is a block diagram illustrating a specific configuration of the frequency sweeper illustrated in FIG. 1.

Meanwhile, the frequency sweeper 24 is configured as illustrated in FIG. 3. The frequency sweeper 24 includes an input terminal ti to which the frequency setting value Dfsw from the frequency setter 23 is input, a first coefficient generator 24a, a second coefficient generator 24b, a third coefficient generator 24c, a shift amount calculator 24d, and an output terminal tout.

The first coefficient generator 24a includes: a counter 31 that counts up and to which the PWM signal $S_{PWM}$ from the PWM signal generator 27 is input; and a code converter (coefficient setter) 32 to which the value counted by the counter 31 is input.

The counter 31 counts the number of pulses in the PWM signal $S_{PWM}$ (that is, the number of times the switching element 13 is switched). The upper limit of the counter determines the number of switches in a single period of frequency spreading control. For a 7-bit counter, for example, one period of frequency spreading control can include up to 128 switching cycles.

Figure 4A:
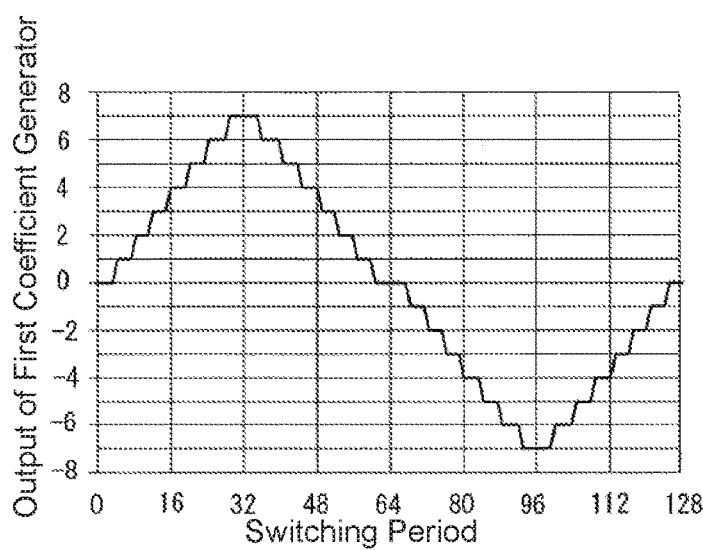
FIGS. 4A to 4C contain graphs showing examples of the input/output properties of the first coefficient generator illustrated in FIG. 3.

The input/output properties of the code converter 32 are set such that the average value of the output for one frequency spreading period is 0. As illustrated in FIG. 4A, for example, the code converter 32 outputs a triangle wave-shaped first coefficient Co1 in which the switching count increases from 0 to 7, returns from 7 back to 0, decreases from 0 to −7, and then returns from −7 back to 0. This first coefficient Co1 determines the number of steps (levels) used to represent changes in the frequency shift amount relative to time. In FIG. 4A, 15 steps are used.

Figure 4B:
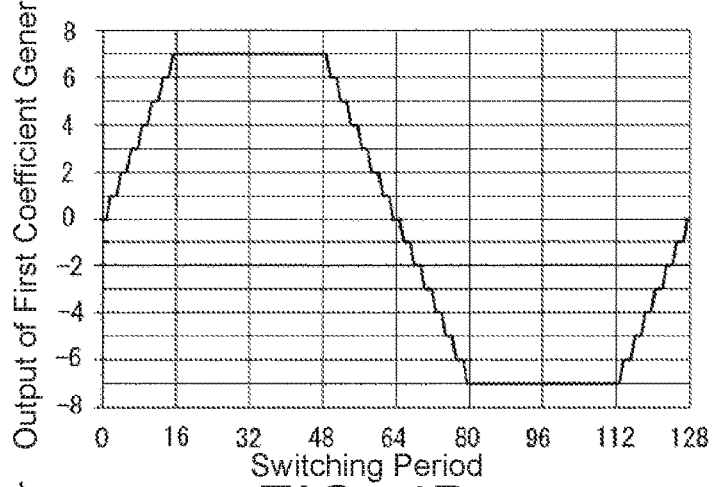
Figure 4C:
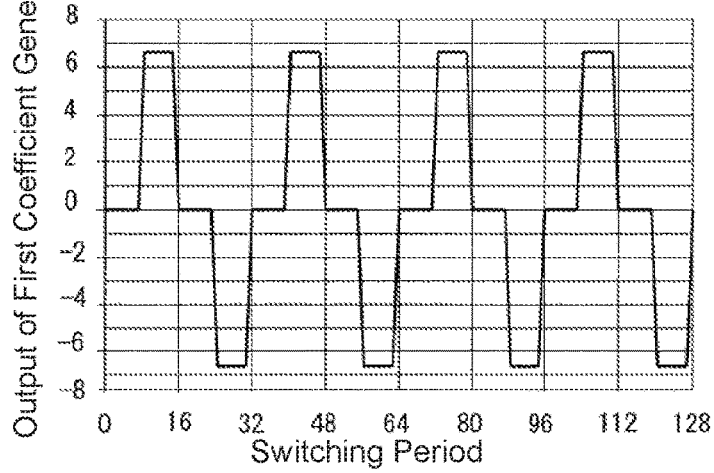

The code converter 32 may be designed to use any frequency spreading pattern as long as the average value of the output over one period is 0. For example, the 15-level trapezoidal wave-shaped pattern illustrated in FIG. 4B or the plurality of 3-level rectangular wave-shaped patterns illustrated in FIG. 4C may be used. All of the patterns illustrated in FIGS. 4A to 4C use the same maximum and minimum values of +7 and −7. However, the maximum and minimum values are not limited to these examples and may be set freely.

The second coefficient generator 24b determines the minimum frequency shift amount for the current switching frequency. The present example assumes that this minimum shift amount is a value that is proportional to the switching frequency. Here, the minimum shift amount is set to be 1% of the switching frequency. The second coefficient generator 24b includes a divider (a dividing circuit) 41 to which the frequency setting value Dfsw is input. The divider 41 divides the frequency setting value Dfsw input thereto by 100 to obtain a second coefficient Co2 that is equal to 1% of the frequency setting value Dfsw, for example. FIG. 5 gives the rounding error-adjusted division results for the input signals assuming that the data widths of the input/output signals of the frequency setter 23 are both equal to 9 bits. In other words, the second coefficient Co2 is 0 when Dfsw<100, the second coefficient Co2 is 1 when 100≤Dfsw<200, the second coefficient Co2 is 2 when 200≤Dfsw<300, and so on, until the second coefficient Co2 is 5 when 500≤Dfsw<511.

Moreover, the divisor used to obtain the second coefficient Co2 from the frequency setting value Dfsw is not limited to being set to 100. The divisor for the frequency setting value Dfsw may be set to any value according to the desired division ratio for the second coefficient Co2.

The third coefficient generator 24c determines the coefficient used when changing the frequency shift amount for each frequency range. The example described here assumes that the input/output properties illustrated in FIG. 2A are used for the frequency setter 23 that is arranged upstream.

As illustrated in FIG. 3, the third coefficient generator 24c includes comparators 51 and 52, a determination device 53, a register 54, and a selector 55.

The comparator 51 compares the frequency setting value Dfsw and the first setting value Dfsw1 input thereto and outputs a comparison signal Sc1 that takes a low level state L when Dfsw≤Dfsw1 and takes a high level state H when Dfsw>Dfsw1.

The comparator 52 compares the frequency setting value Dfsw and the second setting value Dfsw2 input thereto and outputs a comparison signal Sc2 that takes a low level state L when Dfsw<Dfsw2 and takes a high level state H when Dfsw≥Dfsw2.

The register 54 stores three coefficient values (0, 1, and 2) that can be used for the third coefficient Co3 in separate register regions.

The selector 55 selects one of the three coefficients stored in the register 54 on the basis of a selection signal from the determination device 53 and outputs the selected coefficient as the third coefficient Co3.

When the comparison signal Sc1 is in the low level state L, the determination device 53 determines that the frequency setting value Dfsw is equal to the first setting value Dfsw1 and outputs a selection signal for selecting the coefficient of 0 from the register 54 to the selector 55. Similarly, when the comparison signal Sc1 is in the high level H state and the comparison signal Sc2 is in the low level L state, the determination device 53 determines that the frequency setting value Dfsw is between the first setting value Dfsw1 and the second setting value Dfsw2 (that is, Dfsw1<Dfsw<Dfsw2) and outputs a selection signal for selecting the coefficient of 2 from the register 54 to the selector 55. Furthermore, when the comparison signal Sc2 is in the high level state H, the determination device 53 determines that the frequency setting value Dfsw is equal to the first setting value Dfsw2 and outputs a selection signal for selecting the coefficient of 1 from the register 54 to the selector 55.

Here, the comparators 51 and 52 and the determination device 53 form a determination unit 56, and the register 54 and the selector 55 form a selection unit 57.

Therefore, when the input/output properties illustrated in FIG. 2A are used for the frequency setter 23 that is arranged upstream, the third coefficient generator 24c sets the third coefficient Co3 to 0 when the frequency setting value Dfsw input to the frequency sweeper 24 is equal to the first setting value Dfsw1 (that is, when Dfsw=Dfsw1). Moreover, when the frequency setting value Dfsw is greater than the first setting value Dfsw1 and less than the second setting value Dfsw2 (that is, when Dfsw1<Dfsw<Dfsw2), the third coefficient Co3 is set to 2. Furthermore, when the frequency setting value Dfsw is equal to the second setting value Dfsw2 (that is, when Dfsw=Dfsw2), the third coefficient Co3 is set to 1.

The shift amount calculator 24d includes a multiplier 61 and an adder 65.

The multiplier 61 multiplies together the first coefficient Co1 output from the first coefficient generator 24a, the second coefficient Co2 output from the second coefficient generator 24b, and the third coefficient Co3 output from the third coefficient generator 24c in order to calculate a shift amount ΔDfsw. The calculated shift amount ΔDfsw is then output to the adder 62.

The frequency setting value Dfsw input to the input terminal ti and the shift amount ΔDfsw output from the multiplier 61 are input to the adder 62, which adds the frequency setting value Dfsw to the shift amount ΔDfsw in order to calculate a frequency shift amount signal Dfswsp. The calculated frequency shift amount signal Dfswsp is then output to the voltage control oscillator 25. The calculated frequency shift amount signal Dfswsp sets forth an oscillation frequency at a given moment in time, the value and polarity of which changes over time such that the frequency sweep (shift) is achieved (see FIG. 6A). Because the shift amount ΔDfsw can be positive or negative depending on whether the first coefficient Co1 is positive or negative, the adder 62 actually functions as an adder-subtractor.

Therefore, the frequency sweeper 24 can change the frequency shift amount according to the switching count (time) using the first coefficient Co1. Moreover, the frequency sweeper 24 can change the shift amount proportionally to the input signal (the switching frequency information) using the second coefficient Co2. Finally, the frequency sweeper 24 can change the shift amount just for prescribed frequencies using the third coefficient Co3.

Figure 6A:
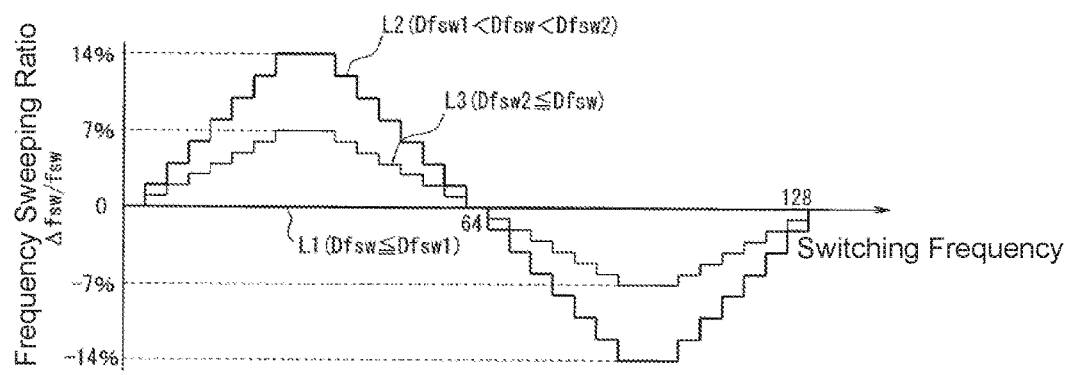
FIGS. 6A and 6B contain graphs showing the input/output properties of the frequency sweeper illustrated in FIG. 3.

Furthermore, FIG. 6A shows the relationship between a frequency shift amount ratio Δfsw/fsw (where Δfsw is the shift amount and fsw is the frequency) and the switching count when the first coefficient generator 24a, the second coefficient generator 24b, and the third coefficient generator 24c are configured as described above.

In other words, the third coefficient Co3 is set to 0 when the frequency setting value Dfsw is less than or equal to the first setting value Dfsw1 (that is, when Dfsw≤Dfsw1), and therefore as shown by the characteristic line L1, the frequency shift amount ratio Δfsw/fsw remains equal to 0 regardless of the switching count.

Moreover, the third coefficient Co3 is set to 2 when the frequency setting value Dfsw is greater than the first setting value Dfsw1 and less than the second setting value Dfsw2 (that is, when Dfsw1<Dfsw<Dfsw2), and therefore as illustrated by the characteristic line L2, the frequency shift amount ratio Δfsw/fsw varies by up to ±14% as the switching count increases.

Furthermore, the third coefficient Co3 is set to 1 when the frequency setting value Dfsw is greater than or equal to the second setting value Dfsw2 (that is, when Dfsw≥Dfsw2), and therefore as shown by the characteristic line L3, the frequency shift amount ratio Δfsw/fsw varies by up to ±7% (that is, by up to half of the maximum variance in the characteristic line L2).

Figure 6B:
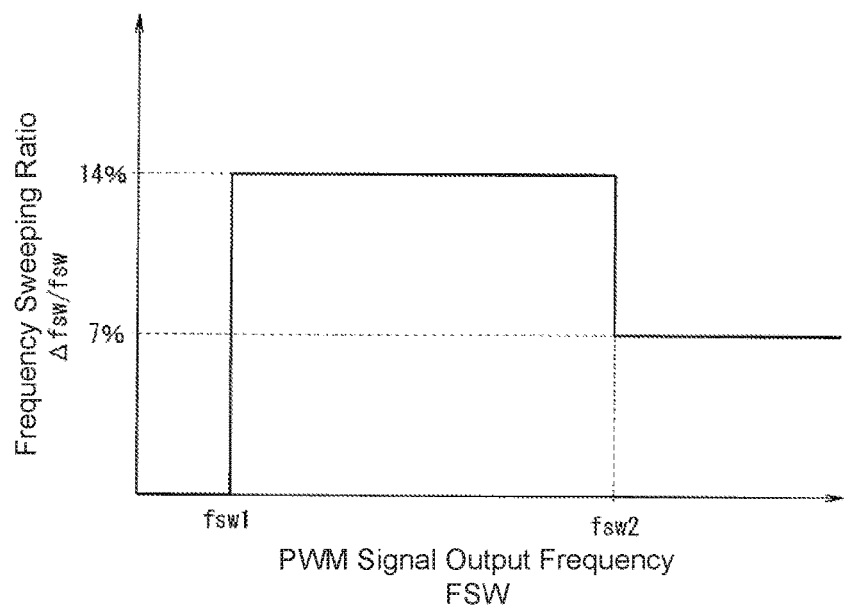

Therefore, as illustrated in FIG. 6B, the maximum value of the frequency shift amount ratio Δfsw/fsw (where fsw is the output frequency (switching frequency) of the PWM signal $S_{PWM}$) is equal to 0% when fsw is less than or equal to a first prescribed frequency fsw1, is equal to 14% when fsw is greater than the first prescribed frequency fsw1 and less than a second prescribed frequency fsw2, and is equal to 7% when fsw is greater than or equal to the second prescribed frequency fsw2.

As described above, the frequency sweeper 24 adds the shift amount ΔDfsw to the frequency setting value Dfsw set by the frequency setter 23 in order to produce a frequency shift amount signal Dfswsp (=Dfsw+ΔDfsw), which is then output to the voltage control oscillator 25.

The voltage control oscillator 25 generates an oscillating voltage signal Vfsw in which the period of the signal is set according to the frequency shift amount signal Dfswsp, and this oscillating voltage signal Vfsw is then output to the PWM signal generator 27. The ON-time generation signal Vton (which is generated by the ON-time generator 26 according to the current detection voltage Vcs that corresponds to the current flowing through the switching element 13 as well as the feedback voltage Vfb generated by the D/A converter 28 that converts the control amount Dpi output from the digital compensator 22 to an analog voltage) is also input to the PWM signal generator 27.

The PWM signal generator 27 generates the PWM signal $S_{PWM}$. This PWM signal $S_{PWM}$ is a rectangular wave that has the same period as the oscillating voltage control signal Vfsw and is maintained at the high level H from the time the oscillating voltage control signal Vfsw rises until the time the ON-time generation signal Vton rises. Moreover, the frequency of the PWM signal $S_{PWM}$ changes with time. This PWM signal $S_{PWM}$ is output to the driver circuit 19, which switches the switching element 13 ON and OFF according to the PWM signal $S_{PWM}$.

As described above, Embodiment 1 includes the frequency setter 23 and the frequency sweeper 24 that output switching frequency information as digital values, thereby making it possible to implement frequency spreading even when using a PFM control scheme and also making it possible to increase efficiency during light loading as well as reduce conductive noise.

Moreover, the frequency sweeper 24 includes three coefficient generators: the first coefficient generator 24a, the second coefficient generator 24b, and the third coefficient generator 24c, which respectively generate the first coefficient Co1 that changes the frequency shift amount according to the switching count (time), the second coefficient Co2 that changes the shift amount proportionally to the frequency setting value (switching frequency information) input from the frequency setter 23, and the third coefficient Co3 that changes the shift amount for prescribed frequencies or frequency ranges. The frequency sweeper 24 can therefore calculate the shift amount as a digital value on the basis of the first to third coefficients Co1 to Co3. This makes it possible to freely and easily change the frequency shift amount just for prescribed frequencies or frequency ranges, thereby solving the problem with the technology disclosed in Patent Document 2.

Next, a switching controller for a switching power supply according to Embodiment 2 of the present invention will be described with reference to FIGS. 7 to 10B.

In Embodiment 2, an auxiliary coil arranged on the primary side of a transformer 12 generates an auxiliary AC voltage that is proportional to a secondary AC voltage induced in a secondary coil TL2. This auxiliary AC voltage is used to detect the output voltage of the switching power supply as well as to supply power to a switching control circuit 20.

Figure 7:
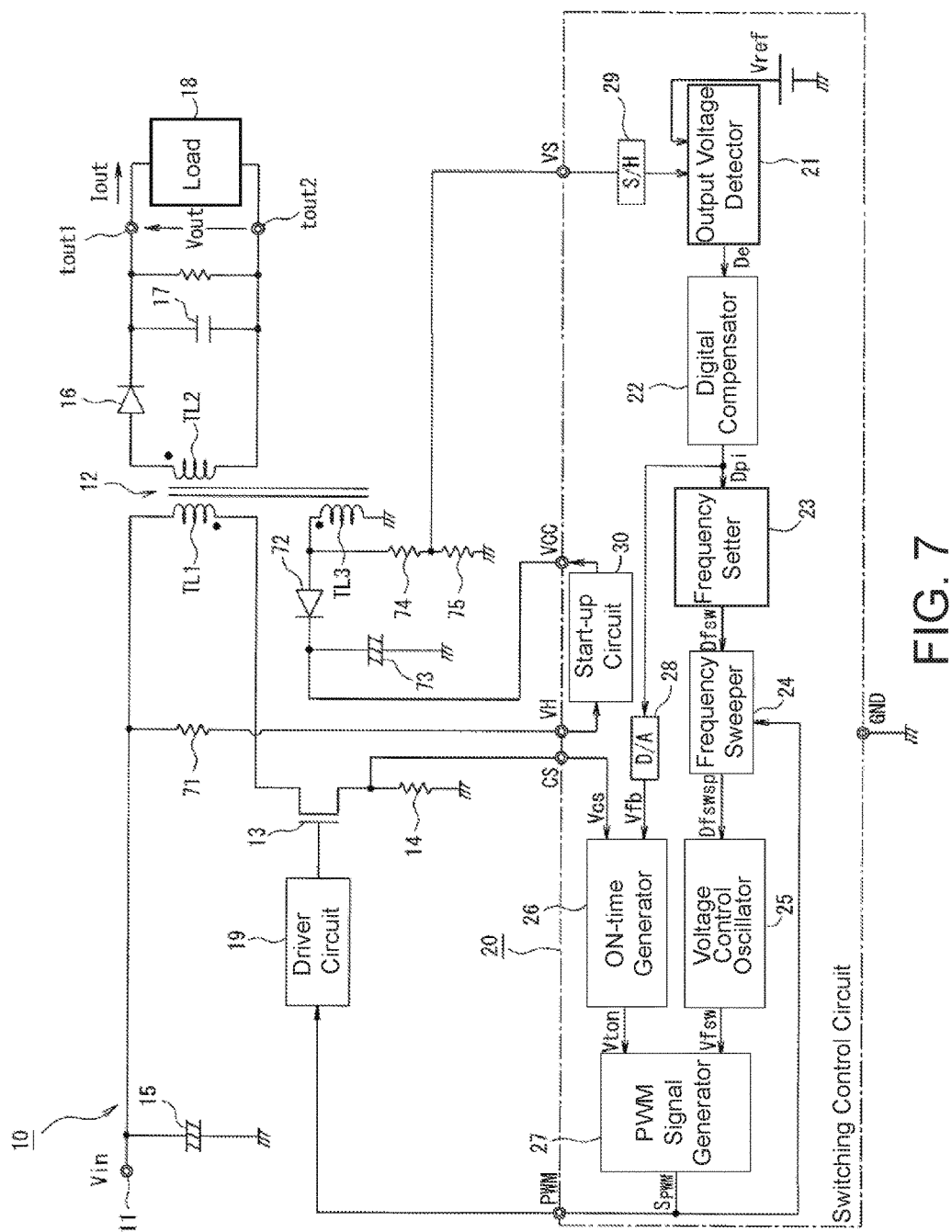
FIG. 7 is a block diagram illustrating a switching controller for a switching power supply according to Embodiment 2 of the present invention.

In other words, as illustrated in FIG. 7, in Embodiment 2 an auxiliary coil TL3 with the same polarity as the secondary coil TL2 is arranged on the primary side of the transformer 12, and this auxiliary coil TL3 generates an auxiliary AC voltage that is proportional to the secondary AC voltage induced in the secondary coil TL2.

A connection point between an input terminal 11 and a primary coil TL1 is connected via a resistor 71 to a high voltage input terminal VH of the switching control circuit 20. Moreover, one end of the auxiliary coil TL3 is connected to the anode of a diode 72, and the cathode of the diode 72 is connected to a power supply terminal VCC. The other end of the auxiliary coil TL3 is grounded. A smoothing capacitor 73 is connected between the cathode of the diode 72 and the ground. The high voltage input terminal VH and the power supply terminal VCC are connected together within the switching control circuit 20 via a starting circuit 30. The starting circuit 30 supplies a charge current for the smoothing capacitor 73 when the switching power supply is turned on.

Furthermore, voltage-dividing resistors 74 and 75 are connected between the ground and a connection point between the one end of the auxiliary coil TL3 and the anode of the diode 72. A connection point between these voltage-dividing resistors 74 and 75 is connected to a sample and hold circuit (S/H) 29 via a detection terminal VS provided in the switching control circuit 20. Therefore, when the switching element 13 is OFF, the auxiliary AC voltage that is induced in the auxiliary coil TL3 and is proportional to the secondary AC voltage induced in the secondary coil TL2 (that is, a voltage that is proportional to the output voltage Vout of a switching power supply 10, or more accurately a voltage that is proportional to the output voltage Vout plus the forward voltage of the diode 16) is applied to the sample and hold circuit 29. The sample and hold circuit 29 samples and holds this proportional voltage for a prescribed period.

Next, the detected voltage that is sampled and held by the sample and hold circuit 29 is input to the output voltage detector 21 of the switching control circuit 20 of Embodiment 1. The rest of the configuration is the same as the configuration of Embodiment 1 as illustrated in FIG. 1 except in that the insulated signal transmission element of the output voltage detector 21 is no longer needed. The same reference characters are used for the components that are the same as in FIG. 1, and detailed descriptions of such components are omitted here.

In Embodiment 2, the input voltage of the switching power supply 10 is an AC voltage of 90 to 255V, the output voltage is 19V, and the rated load is 65 W, for example.

Figure 8A:
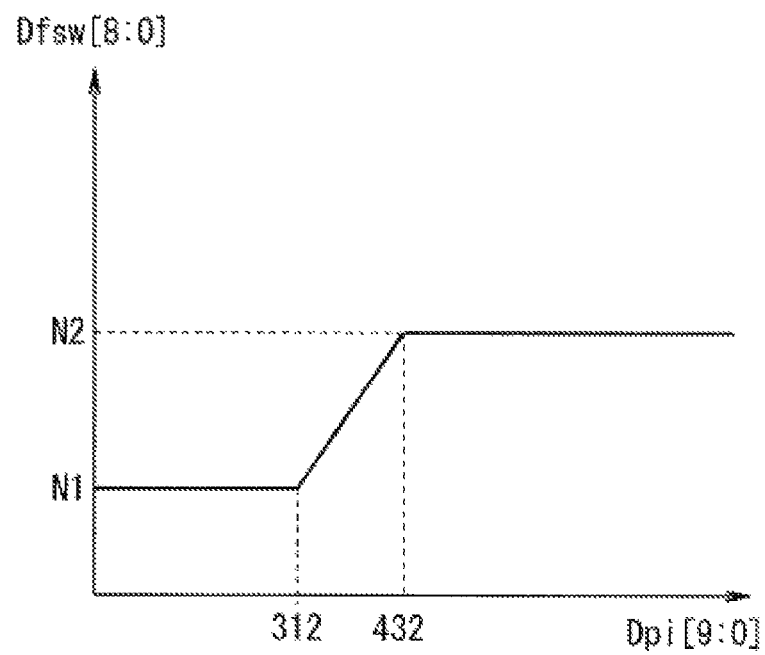
FIGS. 8A and 8B contain graphs showing the input/output properties of the frequency setter and the voltage control oscillator illustrated in FIG. 7.
Figure 8B:
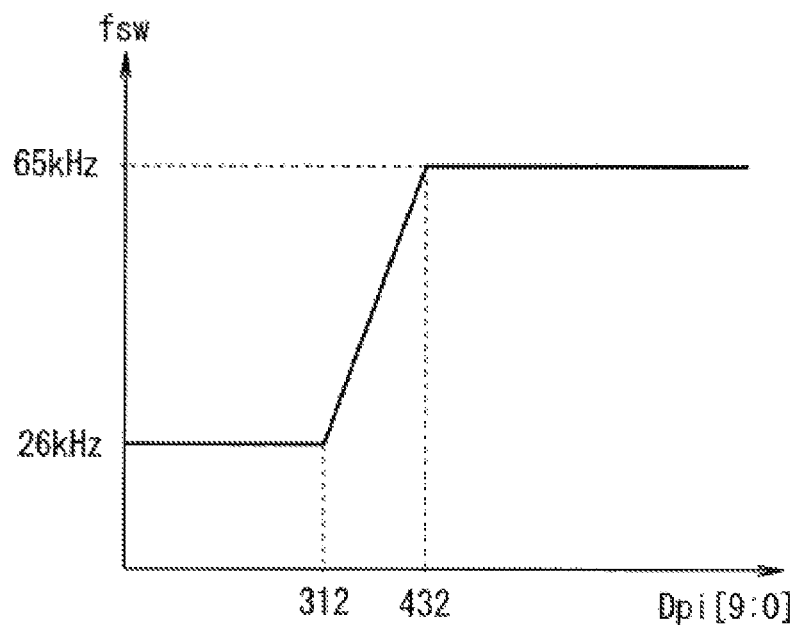

Furthermore, the frequency setter 23 of the switching control circuit 20 has the input/output properties illustrated in FIG. 8A. The first prescribed control amount Dpi1 is set to 312, and the second prescribed control amount Dpi2 is set to 432. FIG. 8B illustrates the switching frequency fsw as a function of the control amount Dpi input to the frequency setter 23. As illustrated in FIG. 8B, when the control amount Dpi is equal to the first prescribed control amount Dpi1=312, the switching frequency fsw is set to a first prescribed frequency fsw1=26 kHz, and when the control amount Dpi is equal to the second prescribed control amount Dpi2=432, the switching frequency fsw is set to a second prescribed frequency fsw2=65 kHz.

Figures 9A, 9B:
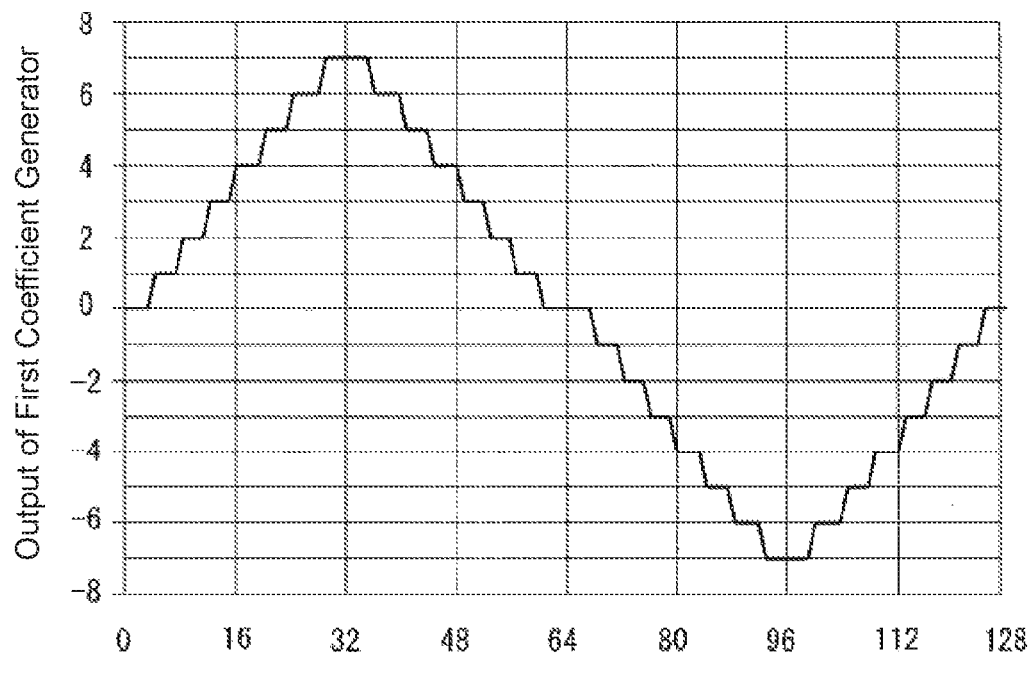
FIGS. 9A and 9B contain a graph and a table showing the input/output characteristics of the frequency sweeper illustrated in FIG. 7.

Furthermore, as illustrated in FIG. 9A, in the frequency sweeper 24 of the switching control circuit 20, the changes in the first coefficient Co1 from the first coefficient generator 24a as a function of switching cycles are the same as in Embodiment 1 as illustrated in FIG. 4A. Moreover, the divider 41 is a 7-bit shift register that divides the frequency setting value Dfsw by 128. FIG. 9B shows the relationship between the frequency ranges of the frequency setting value Dfsw (which is input to the second coefficient generator 24b of the frequency sweeper 24) and the second coefficient Co2. As illustrated in FIG. 9B, the second coefficient Co2 is set to 1 when Dfsw<128, the second coefficient Co2 is set to 2 when 128≤Dfsw<192 and when 192≤Dfsw<256, and so on, until the second coefficient Co2 is set to 5 when 448≤Dfsw<511.

Figure 10A:
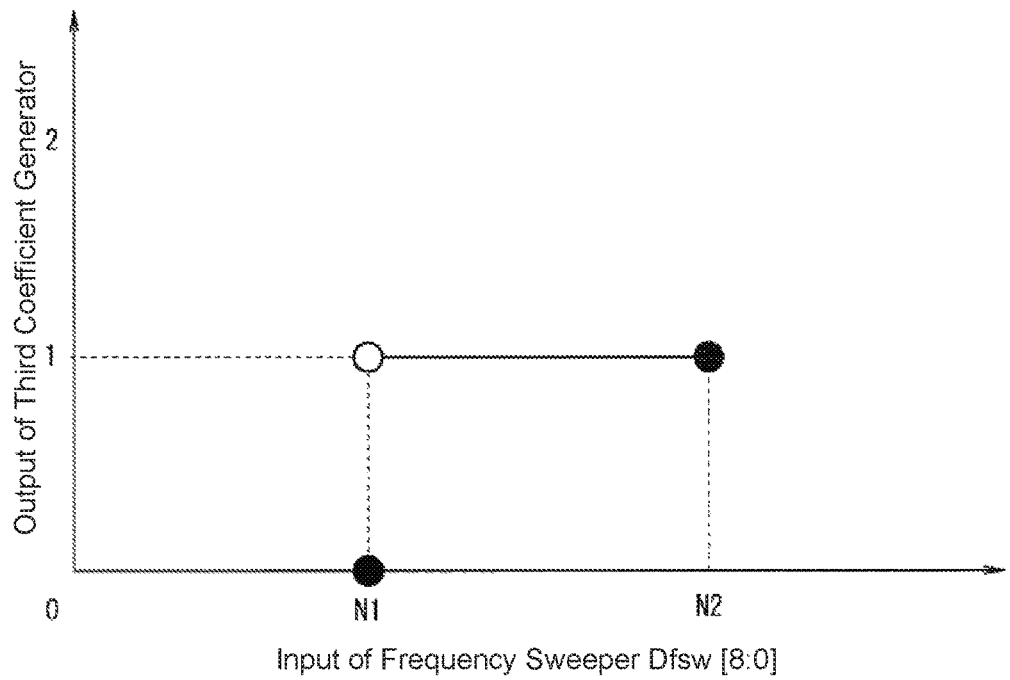
FIGS. 10A and 10B contain graphs showing the input/output properties of the third coefficient generator of the frequency sweeper illustrated in FIG. 7.
Figure 10B:
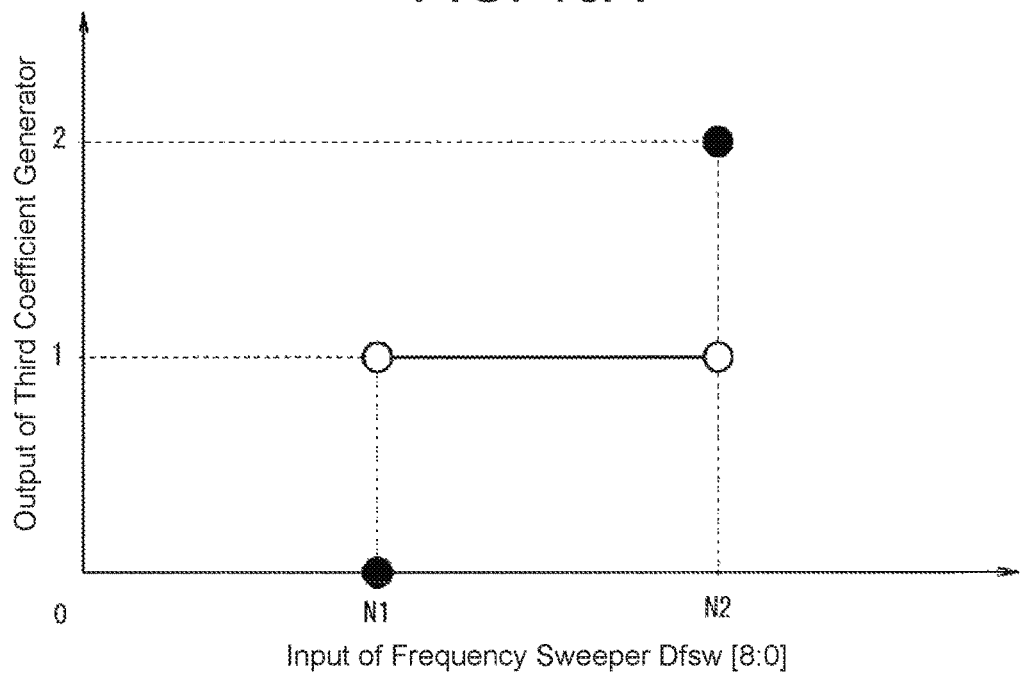

Furthermore, the value used for the third coefficient Co3 is set according to the frequency setting value Dfsw input to the third coefficient generator 24c of the frequency sweeper 24 using the two schemes illustrated in FIGS. 10A and 10B in order to compare evaluations of the resulting conductive EMI.

As illustrated in FIG. 10A, in the first setting scheme, the third coefficient Co3 is set to 0 when the frequency setting value Dfsw is equal to a first frequency setting value N1 (here, 26 kHz), and the third coefficient Co3 is set to 1 when the frequency setting value Dfsw is less than or equal to a second frequency setting value N2 (here, 65 kHz) that is greater than the first frequency setting value N1.

As illustrated in FIG. 10B, in the second setting scheme, the third coefficient Co3 is set to 0 when the frequency setting value Dfsw is equal to a first frequency setting value N1 (here, 26 kHz), the third coefficient Co3 is set to 1 when the frequency setting value Dfsw is greater than the first frequency setting value N1 and less than a second frequency setting value N2 (here, 65 kHz), and the third coefficient Co3 is set to 2 when the frequency setting value Dfsw is equal to the second frequency setting value N2 (65 kHz).

When the first setting scheme is used in the third coefficient generator 24c and the switching frequency is 65 kHz, the frequency shift amount ratio has a maximum magnitude of 7%, and when the second setting scheme is used and the switching frequency is 65 kHz, the frequency shift amount ratio has a maximum magnitude of 14%.

The switching power supply 10 and the switching control circuit 20 in Embodiment 2 function the same as in Embodiment 1 except in that the third coefficient Co3 generated by the third coefficient generator 24c can be set according to two different setting schemes. In other words, Embodiment 2 makes it possible to implement frequency spreading even when using a PFM control scheme and also making it possible to increase efficiency during light loading as well as reduce conductive noise. Furthermore, the frequency sweeper 24 includes three coefficient generators: the first coefficient generator 24a, the second coefficient generator 24b, and the third coefficient generator 24c. The frequency sweeper 24 can therefore calculate the shift amount as a digital value on the basis of the first to third coefficients Co1 to Co3. This makes it possible to freely and easily change the frequency shift amount just for prescribed frequencies or frequency ranges, thereby solving the problem with the technology disclosed in Patent Document 2.

Figure 11:
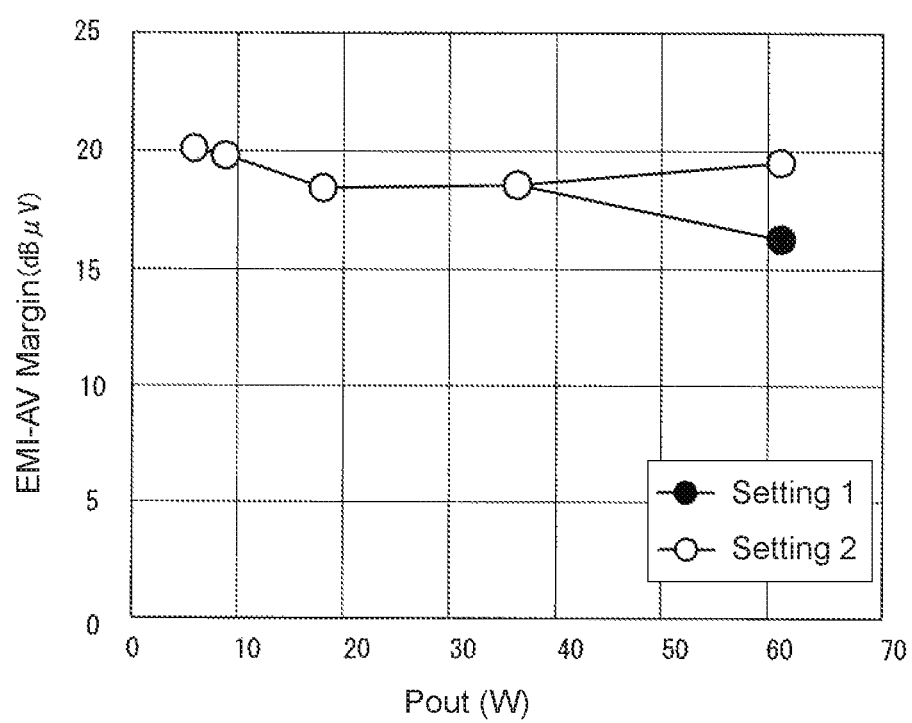
FIG. 11 is a graph showing the results of a conductive EMI measurement test that illustrates the effects in one aspect of the present invention.
Figure 12:
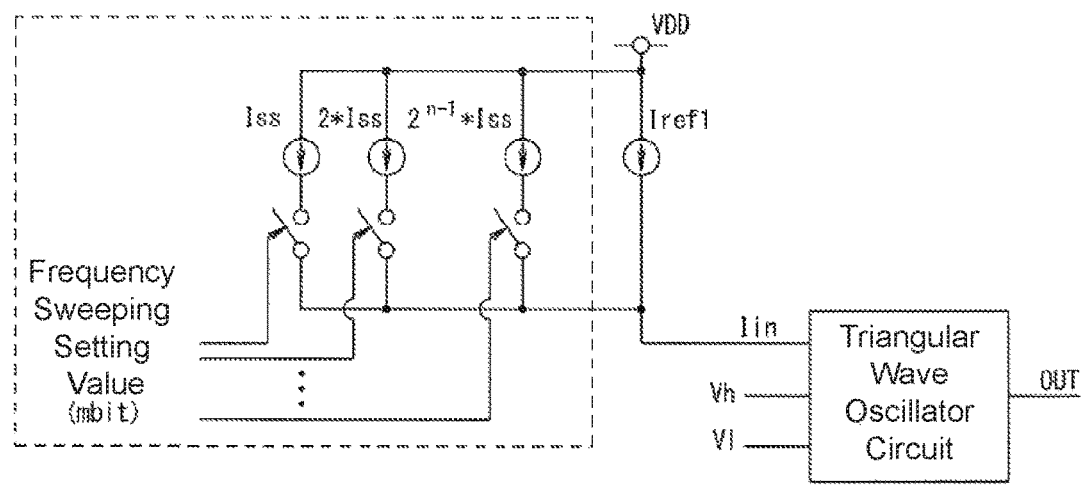
FIG. 12 illustrates the configuration of a conventional technology disclosed in Patent Document 1.
Figure 13:
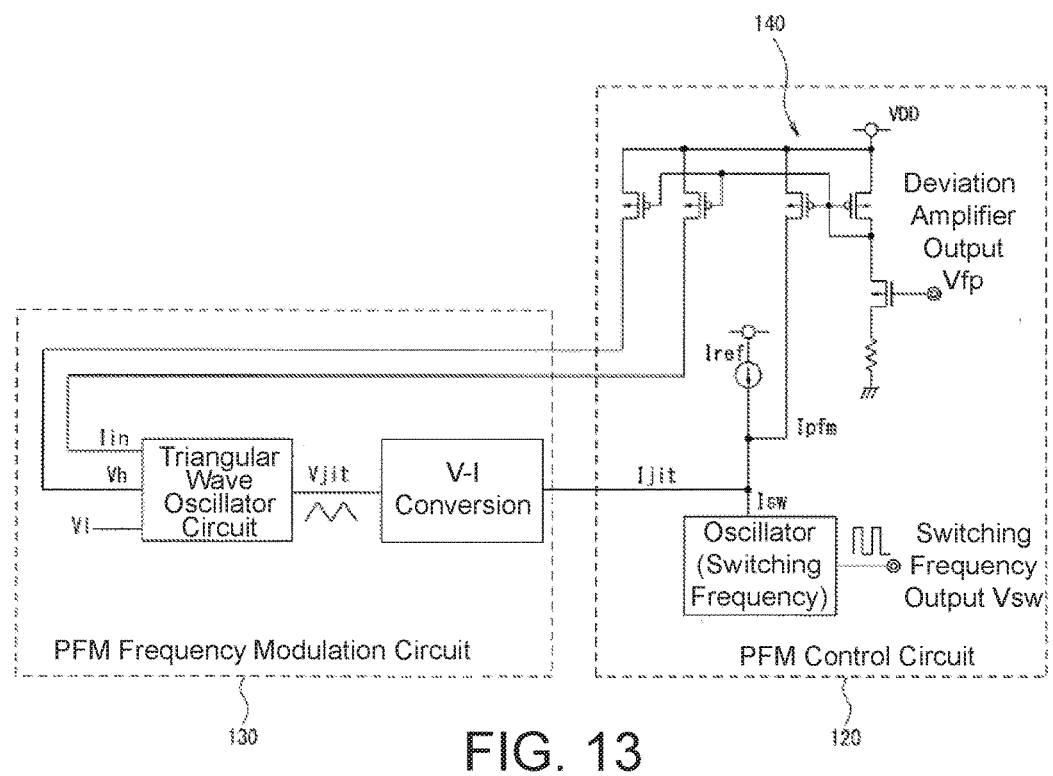
FIG. 13 illustrates the configuration of a conventional technology disclosed in Patent Document 2.

FIG. 11 shows the results of conductive EMI evaluations performed using the first setting scheme and the second setting scheme in the third coefficient generator 24c. FIG. 11 shows the relationship between the output power Pout (W) supplied to the load 18 of the switching power supply 10 and the resulting EMI-AV margin (dBµV). The first setting scheme and the second setting scheme produce substantially the same EMI-AV margin relative to a regulation value when the output power Pout is approximately 5 W to 36 W. However, when the output power Pout increases to near the rated load (output power Pout=61 W) when running the switching power supply 10 at a switching frequency of 65 kHz, using the first setting scheme in the third coefficient generator 24c decreases the EMI-AV margin. Meanwhile, using the second setting scheme makes it possible to increase the EMI-AV margin.

As illustrated in FIG. 11, in the embodiments described above, when a sufficient noise margin is maintained for most frequency bands but the noise margin becomes insufficient just in a certain frequency band, the third coefficient Co3 generated by the third coefficient generator 24c can be set to a larger value of 2 just for the frequency band in which the noise margin is insufficient, thereby making it possible to resolve the insufficient noise margin. This makes it possible for at least one aspect of the present invention to exhibit a more significant effect in cases in which the noise margin is insufficient just in a particular frequency band.

In Embodiments 1 and 2 as described above, the driver circuit 19 that drives the switching element 13 is provided outside of the switching control circuit 20. However, the present invention is not limited to these embodiments, and the driver circuit 19 may instead be arranged within the switching control circuit 20.

It will be apparent to those skilled in the art that various modifications and variations can be made in the present invention without departing from the spirit or scope of the invention. Thus, it is intended that the present invention cover modifications and variations that come within the scope of the appended claims and their equivalents. In particular, it is explicitly contemplated that any part or whole of any two or more of the embodiments and their modifications described above can be combined and regarded within the scope of the present invention.

What is claimed is:

1. A switching controller for a switching power supply, comprising:
   an output voltage detector that detects a deviation of an output voltage of the switching power supply from a target voltage;
   a compensator that calculates a control amount in accordance with the deviation detected by the output voltage detector;
   a frequency setter that sets a primary frequency in accordance with the control amount calculated by the compensator;
   a frequency sweeper that generates a frequency shift amount that changes in time and adds the generated frequency shift amount to the primary frequency set by the frequency setter so as to set a time-varying frequency;
   a voltage control oscillator that outputs an oscillating signal having the time-varying frequency set by the frequency sweeper;
   an ON-time generator configured to receive a signal indicating a current flowing through a switching element of the switching power supply and the control amount calculated by the compensator, the ON-time generator generating an ON time signal in accordance with the received signal indicating the current and the control amount; and
   a pulse-width modulation signal generator that receives the oscillating signal having the time-varying frequency from the voltage control oscillator and the ON time signal from the ON-time generator and generates a pulse-width modulation signal in accordance therewith for use in switching the switching element of the switching power supply;
   wherein the frequency sweeper includes:
      a first coefficient generator that generates a periodically time-varying first coefficient that sets forth a frequency sweeping period and a primary shape of a frequency sweeping curve;
      a second coefficient generator that generates a second coefficient having a value with respect to each possible frequency or each possible range of frequencies that the frequency setter may set as the primary frequency;
      a third coefficient generator that generates a third coefficient having a value with respect to each possible frequency or each possible range of frequencies that the frequency setter may set as the primary frequency, the third coefficient generator being independently settable from the second coefficient generator; and
      a shift amount calculator that calculates the frequency shift amount to be added to the primary frequency on the basis of the first coefficient, the second coefficient, and the third coefficient.

2. The switching controller for the switching power supply according to claim 1,
   wherein the shift amount calculator is a multiplier that multiplies the first coefficient, the second coefficient, and the third coefficient together to generate said frequency shift amount that changes in time, and
   wherein the frequency sweeper further includes an adder that adds said frequency shift amount generated by the multiplier to the primary frequency set by the frequency setter.

3. The switching controller for the switching power supply according to claim 1, wherein the first coefficient generator includes:
   a counter that sequentially and periodically counts a number of switching pulses in the pulse-width modulation signal generated by the pulse-width modulation signal generator; and
   a coefficient setter that prescribes the first coefficient for each of the counted number of switching pulses counted by the counter.

4. The switching controller for the switching power supply according to claim 3, wherein an average value of the first coefficients prescribed by the coefficient setter during the frequency sweeping period where the counted number of the switching pulses runs from 1 to maximum is 0.

5. The switching controller for the switching power supply according to claim 1, wherein the second coefficient generator generates the second coefficient such that a value of the second coefficient is generally proportional to a value of the primary frequency set by the frequency setter.

6. The switching controller for the switching power supply according to claim 5, wherein the second coefficient generator is a circuit that divides the value of the primary frequency set by the frequency setter.

7. The switching controller for the switching power supply according to claim 1, wherein the third coefficient generator includes:
- a determination unit that determines whether the primary frequency set by the frequency setter belongs to one or more of prescribed ranges of frequencies;
- a plurality of registers respectively storing prescribed values; and
- a selector that selects one of the plurality of registers in accordance with a determination result of the determination unit and then outputs the value stored in the selected register as the third coefficient.

8. The switching controller for the switching power supply according to claim 1,
wherein the first coefficient generator includes:
- a counter that sequentially and periodically counts a number of switching pulses in the pulse-width modulation signal generated by the pulse-width modulation signal generator; and
- a coefficient setter that prescribes the first coefficient for each of the counted number of switching pulses counted by the counter, and wherein the second coefficient generator generates the second coefficient such that a value of the second coefficient is generally proportional to a value of the primary frequency set by the frequency setter.

9. The switching controller for the switching power supply according to claim 1,
wherein the first coefficient generator includes:
- a counter that sequentially and periodically counts a number of switching pulses in the pulse-width modulation signal generated by the pulse-width modulation signal generator; and
- a coefficient setter that prescribes the first coefficient for each of the counted number of switching pulses counted by the counter, and wherein the third coefficient generator includes:
- a determination unit that determines whether the primary frequency set by the frequency setter belongs to one or more of prescribed ranges of frequencies;
- a plurality of registers respectively storing prescribed values; and
- a selector that selects one of the plurality of registers in accordance with a determination result of the determination unit and then outputs the value stored in the selected register as the third coefficient.

10. The switching controller for the switching power supply according to claim 1,
wherein the second coefficient generator generates the second coefficient such that a value of the second coefficient is generally proportional to a value of the primary frequency set by the frequency setter, and
wherein the third coefficient generator includes:
- a determination unit that determines whether the primary frequency set by the frequency setter belongs to one or more of prescribed ranges of frequencies;
- a plurality of registers respectively storing prescribed values; and
- a selector that selects one of the plurality of registers in accordance with a determination result of the determination unit and then outputs the value stored in the selected register as the third coefficient.

11. The switching controller for the switching power supply according to claim 1,
wherein the first coefficient generator includes:
- a counter that sequentially and periodically counts a number of switching pulses in the pulse-width modulation signal generated by the pulse-width modulation signal generator; and
- a coefficient setter that prescribes the first coefficient for each of the counted number of switching pulses counted by the counter, wherein the second coefficient generator generates the second coefficient such that a value of the second coefficient is generally proportional to a value of the primary frequency set by the frequency setter, and
wherein the third coefficient generator includes:
- a determination unit that determines whether the primary frequency set by the frequency setter belongs to one or more of prescribed ranges of frequencies;
- a plurality of registers respectively storing prescribed values; and
- a selector that selects one of the plurality of registers in accordance with a determination result of the determination unit and then outputs the value stored in the selected register as the third coefficient.

* * * * *

UNITED STATES PATENT AND TRADEMARK OFFICE
CERTIFICATE OF CORRECTION

| | |
|---|---|
| PATENT NO. | : 9,762,130 B2 |
| APPLICATION NO. | : 15/150658 |
| DATED | : September 12, 2017 |
| INVENTOR(S) | : Tetsuya Kawashima |

It is certified that error appears in the above-identified patent and that said Letters Patent is hereby corrected as shown below:

In the Specification

Column 6, Line 66, the text "Tout" should be changed to -- Iout --.

Signed and Sealed this
Fifth Day of December, 2017

Joseph Matal
*Performing the Functions and Duties of the*
*Under Secretary of Commerce for Intellectual Property and*
*Director of the United States Patent and Trademark Office*